(12) United States Patent
Xu et al.

(10) Patent No.: US 9,693,331 B2
(45) Date of Patent: Jun. 27, 2017

(54) METHOD AND APPARATUS FOR UPLINK INTERFERENCE AVOIDANCE IN CASE OF TIMING ADVANCE GROUP RECONFIGURATION

(71) Applicant: FUJITSU LIMITED, Kawasaki-shi, Kanagawa (JP)

(72) Inventors: Haibo Xu, Beijing (CN); Yanling Lu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/195,463

(22) Filed: Jun. 28, 2016

(65) Prior Publication Data
US 2016/0309438 A1     Oct. 20, 2016

Related U.S. Application Data

(63) Continuation of application No. 14/307,814, filed on Jun. 18, 2014, now Pat. No. 9,408,228, which is a
(Continued)

(51) Int. Cl.
*H04W 72/04* (2009.01)
*H04W 72/12* (2009.01)
(Continued)

(52) U.S. Cl.
CPC ....... *H04W 56/0045* (2013.01); *H04L 5/0048* (2013.01); *H04W 72/00* (2013.01); *H04W 72/0446* (2013.01); *H04W 72/1284* (2013.01)

(58) Field of Classification Search
CPC ............. H04W 72/00; H04W 56/0045; H04W 72/0446; H04W 72/1284; H04L 5/0048
See application file for complete search history.

(56) References Cited

U.S. PATENT DOCUMENTS 8,111,683 B2   2/2012 Yamamoto et al.
8,396,032 B2   3/2013 Kato et al.
(Continued)

FOREIGN PATENT DOCUMENTS

CN   102131283 A   7/2011
CN   102239735 A   11/2011
(Continued)

OTHER PUBLICATIONS

First Notification of Office Action issued by the State Intellectual Property Office of China for corresponding Chinese Patent Application No. 201180073234.3, dated Nov. 2, 2016, with an English translation.
(Continued)

*Primary Examiner* — Brian D Nguyen
(74) *Attorney, Agent, or Firm* — Myers Wolin, LLC (57) ABSTRACT

Embodiments of the present application provide a method and apparatus for uplink interference avoidance in case of timing advance group reconfiguration. Wherein, the method includes: reconfiguring a TAG belonging to a secondary serving cell by terminal; and terminating, by the terminal, transmission of a periodic channel sounding reference signal Type-0 SRS in the secondary serving cell, and/or terminating, by the terminal, uplink non-adaptive retransmission in the secondary serving cell, after the terminal completes the reconfiguration of the TAG of the secondary serving cell and if a current TAG is a new one. With the embodiments of the present application, a problem of mutual interference with other terminal resulted from transmission of an uplink signal by the terminal in the secondary serving cell according to a wrong TA value may be avoided.

14 Claims, 9 Drawing Sheets

Related U.S. Application Data continuation of application No. PCT/CN2011/085125, filed on Dec. 31, 2011.

(51) Int. Cl.
*H04W 56/00* (2009.01)
*H04W 72/00* (2009.01)
*H04L 5/00* (2006.01)

(56) References Cited

U.S. PATENT DOCUMENTS

| | | | |
|---|---|---|---|
| 8,837,304 B2 * | 9/2014 | Yamada | H04L 1/0618 370/241 |
| 8,917,605 B2 | 12/2014 | Pelletier et al. | |
| 2011/0134774 A1 | 6/2011 | Pelletier et al. | |
| 2011/0243102 A1 * | 10/2011 | Sebire | H04W 56/0045 370/336 |
| 2012/0082107 A1 * | 4/2012 | Ou | H04W 74/0833 370/329 |
| 2012/0287865 A1 * | 11/2012 | Wu | H04W 74/006 370/329 |
| 2013/0034085 A1 * | 2/2013 | Bostrom | H04W 56/0045 370/336 |
| 2013/0044843 A1 * | 2/2013 | Malkamaki | H04W 56/00 375/356 |
| 2015/0351062 A1 | 12/2015 | Chang et al. | |

FOREIGN PATENT DOCUMENTS

| | | |
|---|---|---|
| CN | 102291837 A | 12/2011 |
| JP | 2009-225160 A | 10/2009 |
| JP | 2011-142667 A | 7/2011 |
| JP | 2013-511916 A | 4/2013 |
| WO | 2011/063244 A2 | 5/2011 |

OTHER PUBLICATIONS

Search Report issued by the State Intellectual Property Office of China for corresponding Chinese Patent Application No. 201180073234.3, dated Nov. 2, 2016, with an English translation.
Extended European search report with supplementary European search report and the European search opinion issued by the European Patent Office for corresponding European Patent Application No. 11878608.6, mailed on Nov. 16, 2015.
International search report issued for corresponding international application No. PCT/CN2011/085125, mailed Oct. 18, 2012.
Notice of Reason for Rejection issued by the Japan Patent Office for corresponding Japanese Patent Application No. 2014-549292, mailed on Aug. 18, 2015, with an English translation.
Huawei, "TAG Change Scenarios", Agenda Item: 7.1.1.1, 3GPP TSG-RAN WG2 Meeting #75bis, R2-115004, Zhuhai, China, Oct. 10-14, 2011.
Partial supplementary European search report issued by the European Patent Office for corresponding European Patent Application No. 11878608.6, mailed on Jul. 27, 2015.
Notice of Preliminary Rejection issued for corresponding Korean Patent Application No. 10-2014-7019141 mailed on May 1, 2015. The English translation is included.
Non-Final Office Action issued for corresponding U.S. Appl. No. 14/307,814, issued Nov. 5, 2015.

* cited by examiner

METHOD AND APPARATUS FOR UPLINK INTERFERENCE AVOIDANCE IN CASE OF TIMING ADVANCE GROUP RECONFIGURATION

CROSS-REFERENCE TO RELATED APPLICATIONS

This application is a continuation of U.S. application Ser. No. 14/307,814, filed Jun. 18, 2014, now U.S. Pat. No. 9,408,228, which issued Aug. 2, 2014, which is a continuation of International Application No. PCT/CN2011/085125, filed on Dec. 31, 2011, the contents of each are herein wholly incorporated by reference.

TECHNICAL FIELD

The present application relates to the field of communications, and in particular to a method and apparatus for uplink interference avoidance in case of timing advance group reconfiguration.

BACKGROUND

In Rel-10 of a long-term evolution advanced (LTE-A) system, in order to provide a higher transmission rate to terminal, a carrier aggregation technology is introduced and 5 deployment scenarios of the carrier aggregation technology are defined. However, in the Rel-10, for an uplink, intra-band carrier aggregation is only supported. And at the same time, for scenarios 4 and 5, that is, scenarios where receiving stations of uplink signals of different carriers are different, an uplink carrier aggregation technology is not supported. In LTE-A Rel-11, the carrier aggregation technology is further enhanced, with one aspect of enhancement being that for an uplink, carrier aggregation in different bands is supported, and uplink carrier aggregation being supported in scenarios 4 and 5.

Figure 1:
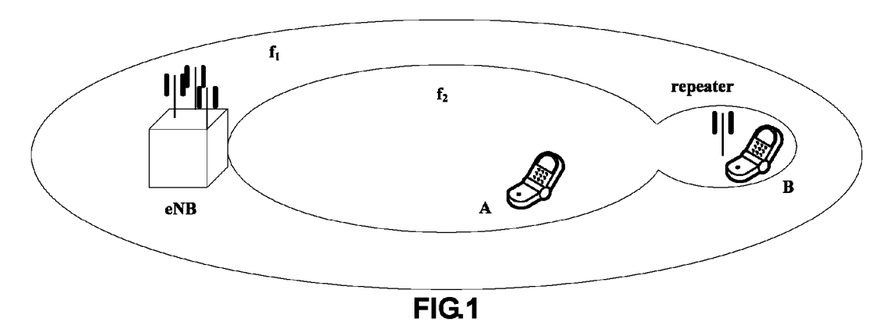
FIG. 1 is a schematic diagram of needing to reconfigure a TAG.

When timing advance of an uplink signal of a secondary serving cell configured for terminal is different from that of a timing advance group (TAG) where the secondary serving cell is present, the secondary serving cell needs to be reconfigured to a correct TAG. FIG. 1 is a schematic diagram of needing to reconfigure a TAG. In this figure, an eNB configures terminal with a primary serving cell f1 and a secondary serving cell f2, both of them belonging to the same band.

A first case: the terminal is located at A point at a moment T1, when receiving stations of the secondary serving cell (Scell) and the primary serving cell (Pcell) are identical, which are eNBs; hence, they belong to the same TAG, which is defined as a pTAG (i.e. a TAG where a Pcell is present). At a moment T2, the terminal moves to a coverage (such as point B) of a repeater, when a receiving station of uplink signals in the Scell is changed into the repeater, which is different from a receiving station of the Pcell. Hence, the Scell is no longer suitable to belonging to the same TAG as that of the Pcell, and needs to be reconfigured to a new TAG, which is defined as a sTAG (i.e. a TAG where there exists a Scell only).

A second case: contrary to the first case, the terminal moves from the coverage of the repeater to the coverage of the eNB. In such a case, the Scell of the terminal needs to be reconfigured from the sTAG to the pTAG.

For the above second case, after the Scell is reconfigured to the pTAG, as a timing advance (TA) value of the pTAG is known, after the reconfiguration process is completed, the terminal may transmit an uplink signal in the Scell immediately. While for the first case, after the Scell is reconfigured to a new sTAG, as an uplink TA value of the new sTAG is unknown, after the reconfiguration process is completed, the terminal needs to execute a random access process in the Scell to obtain an initial TA value of the sTAG. However, in the process of obtaining the TA value of the sTAG by the terminal, if the terminal transmits an uplink signal in the Scell according to the TA value of the pTAG, as the TA value cannot ensure that the time when the uplink signal of the terminal reaches the repeater and those of other terminals are synchronous, it possibly results in mutual interference with other terminals.

It should be noted that the above description of the background art is merely provided for clear and complete explanation of the present application and for easy understanding by those skilled in the art. And it should not be understood that the above technical solution is known to those skilled in the art as it is described in the background art of the present application.

SUMMARY

Embodiments of the present application provide a method and apparatus for uplink interference avoidance in case of timing advance group reconfiguration, so as to solve a problem of interference in the relevant art resulted from that the time when an uplink signal of a terminal reaches an uplink access point and those of other terminals are not synchronous when the terminal performs uplink communication by using an old TA value with a new uplink access point after being TAG reconfigured.

An embodiment of the present application provides a method for uplink interference avoidance in case of timing advance group reconfiguration, including:

reconfiguring, by terminal, a timing advance group belonging to a secondary serving cell; and terminating, by the terminal, transmission of a periodic channel sounding reference signal in the secondary serving cell, and/or terminating, by the terminal, uplink non-adaptive retransmission in the secondary serving cell, after the terminal completes reconfiguration of the timing advance group of the secondary serving cell and if a current timing advance group is a new one.

An embodiment of the present application provides a method for uplink interference avoidance in case of timing advance group reconfiguration, including:

reconfiguring, by terminal, a timing advance group belonging to a secondary serving cell; and releasing, by the terminal, configuration of a periodic channel sounding reference signal of the secondary serving cell, and/or terminating, by the terminal, uplink non-adaptive retransmission in the secondary serving cell, after the terminal completes reconfiguration of the timing advance group of the secondary serving cell and if a current timing advance group is a new one.

An embodiment of the present application provides a method for uplink interference avoidance in case of timing advance group reconfiguration, including:

reconfiguring, by terminal, a timing advance group belonging to a secondary serving cell; and terminating, by the terminal, transmission of a periodic channel sounding reference signal in the secondary serving cell, and/or flushing all buffers of uplink hybrid automatic retransmission requests to which the secondary serving cell corresponds, after the terminal completes reconfiguration of the timing advance group of the secondary serving cell and if a current timing advance group is a new one.

An embodiment of the present application provides a method for uplink interference avoidance in case of timing advance group reconfiguration, including:

reconfiguring, by terminal, a timing advance group belonging to a secondary serving cell; and releasing, by the terminal, configuration of a periodic channel sounding reference signal of the secondary serving cell, and/or flushing all buffers of uplink hybrid automatic retransmission requests to which the secondary serving cell corresponds, after the terminal completes reconfiguration of the timing advance group of the secondary serving cell and if a current timing advance group is a new one.

An embodiment of the present application provides an apparatus for uplink interference avoidance in case of timing advance group reconfiguration, including:

a timing advance group reconfiguring unit, configured to reconfigure a timing advance group belonging to a secondary serving cell;

a judging unit, configured to judge whether the reconfigured timing advance group is a new one, and if yes, notifying an executing unit; and the executing unit, configured to terminate transmission of a periodic channel sounding reference signal in the secondary serving cell performed by terminal, and/or terminate uplink non-adaptive retransmission in the secondary serving cell performed by the terminal, according to a notification transmitted by the judging unit.

An embodiment of the present application provides an apparatus for uplink interference avoidance in case of timing advance group reconfiguration, including:

a timing advance group reconfiguring unit, configured to reconfigure a timing advance group belonging to a secondary serving cell;

a judging unit, configured to judge whether the reconfigured timing advance group is a new one, and if yes, notifying an executing unit; and the executing unit, configured to release configuration of a periodic channel sounding reference signal of the terminal in the secondary serving cell, and/or terminate uplink non-adaptive retransmission in the secondary serving cell performed by the terminal, according to a notification transmitted by the judging unit.

An embodiment of the present application provides an apparatus for uplink interference avoidance in case of timing advance group reconfiguration, including:

a timing advance group reconfiguring unit, configured to reconfigure a timing advance group belonging to a secondary serving cell;

a judging unit, configured to judge whether the reconfigured timing advance group is a new one, and if yes, notifying an executing unit; and the executing unit, configured to terminate transmission of a periodic channel sounding reference signal in the secondary serving cell performed by the terminal, and/or flush all buffers of uplink hybrid automatic retransmission requests to which the secondary serving cell of the terminal corresponds, according to a notification transmitted by the judging unit.

An embodiment of the present application provides an apparatus for uplink interference avoidance in case of timing advance group reconfiguration, including:

a timing advance group reconfiguring unit, configured to reconfigure a timing advance group belonging to a secondary serving cell;

a judging unit, configured to judge whether the reconfigured timing advance group is a new one, and if yes, notifying an executing unit; and the executing unit, configured to release configuration of a periodic channel sounding reference signal of the terminal in the secondary serving cell, and/or flush all buffers of uplink hybrid automatic retransmission requests to which the secondary serving cell of the terminal corresponds, according to a notification transmitted by the judging unit.

The advantage of the embodiments of the present application resides in that interference of a terminal to other terminals due to that the terminal performs communication with an access point in a new TAG by using an old TA value, after it performs TAG reconfiguration but has not updated the TA value.

With reference to the following description and drawings, the particular embodiments of the present application are disclosed in detail, and the principle of the present application and the manners of use are indicated. It should be understood that the scope of the embodiments of the present application is not limited thereto. The embodiments of the present application contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present application, which constitute a part of this application, and are not intended to limit the present application. In the drawings.

DETAILED DESCRIPTION

For the object, technical solution and advantage of the present application to be more clear, particular embodiments of the present application shall be described below in detail. The illustrative embodiments of the present application and their description are for explanation of the present application, and not intended to limit the present application.

Embodiment 1

Figure 2:
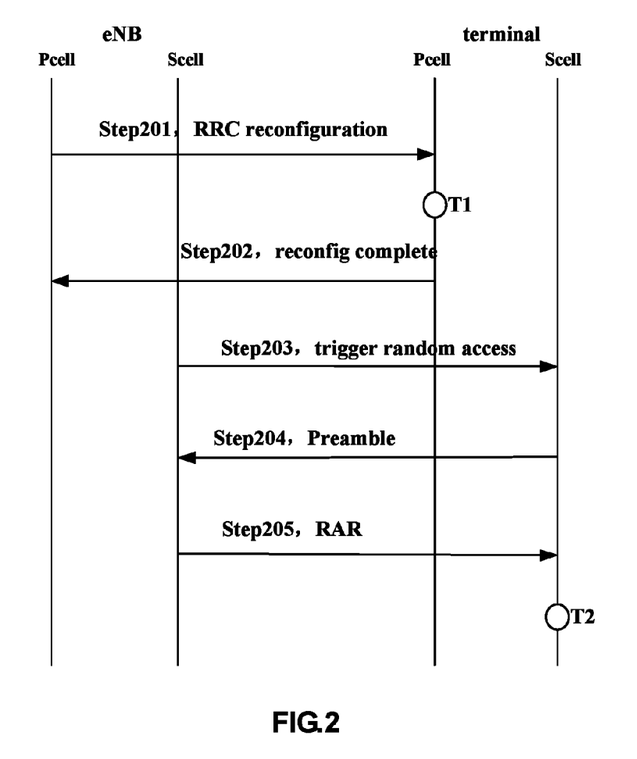
FIG. 2 is a flowchart of a terminal being reconfigured from a pTAG to a new sTAG and obtaining a TA value of an embodiment of the present application.

FIG. 2 is a flowchart of a terminal being reconfigured from a pTAG to a new sTAG and obtaining a TA value of an embodiment of the present application.

This embodiment is applicable to the second case in FIG. 1, and is also applicable to scenarios 2 and 3 of carrier aggregation. In scenarios 2 and 3, when a plurality of serving cells configured for the terminal are carriers in different bands, in case of a 2%-3% probability, uplink timing advance of these serving cells will be different, and a process of a pTAG being reconfigured to a new sTAG and a TA value being obtained needs to be performed.

Step 201: judging, by terminal, whether a secondary serving cell needs TAG reconfiguration. An eNB transmits a radio resource reconfiguration signaling to the terminal, and the terminal performs the TAG reconfiguration of the secondary serving cell, that is, reconfiguring the secondary serving cell from a pTAG to a sTAG, the time of completion of the reconfiguration being taken as T1;

step 202: feeding back, by the terminal to the eNB, a reconfiguration completion message;

step 203: transmitting, by the eNB to the terminal, PDCCH order to trigger the terminal to initiate a random access process in the secondary serving cell;

step 204: transmitting, by the terminal, a preamble in the secondary serving cell; and step 205: feeding back, by the eNB to the terminal, a response (RAR) to the secondary serving cell, the response including a TA value, and the time of receiving a TA value of a new TAG by the terminal being taken as T2.

In addition to the TA value obtained in steps 203-205, a TA value may also be obtained from a TA command medium access control protocol layer control element (TA command MAC CE).

Embodiment 2

Figure 3:
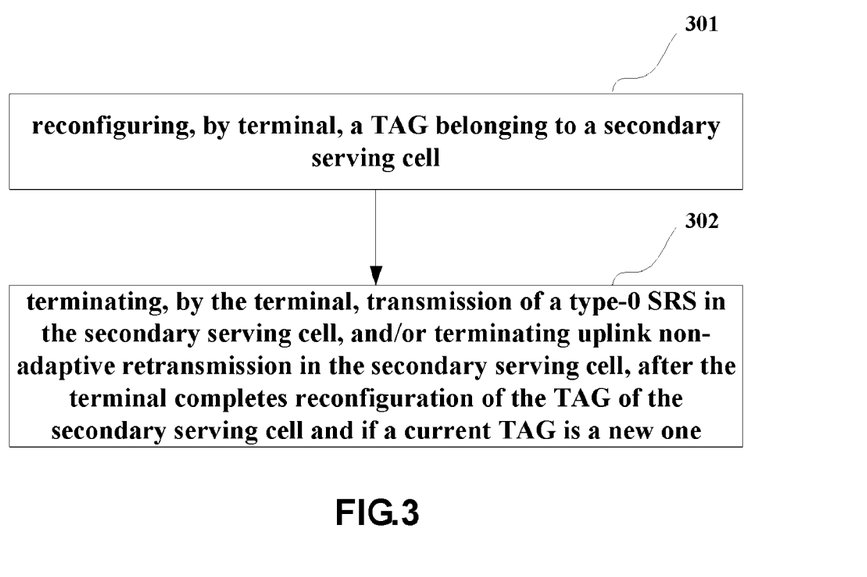
FIG. 3 is a flowchart of a method for uplink interference avoidance in case of timing advance group reconfiguration of an embodiment of the present application.

FIG. 3 is a flowchart of a method for uplink interference avoidance in case of timing advance group reconfiguration of an embodiment of the present application.

Step 301: reconfiguring, by terminal, a TAG belonging to a secondary serving cell; and Step 302: terminating, by the terminal, transmission of a periodic channel sounding reference signal (type-0 SRS) in the secondary serving cell, and/or terminating, by the terminal, uplink non-adaptive retransmission in the secondary serving cell, after the terminal completes reconfiguration of the TAG of the secondary serving cell and if a current TAG is a new one.

Step 302 further includes: canceling, by the terminal, transmission of an aperiodic channel sounding reference signal (type-1 SRS) in the secondary serving cell, if there is a pending aperiodic channel sounding reference signal in the secondary serving cell.

After step 302, the method further includes: restarting the transmission of the type-0 SRS in the secondary serving cell by the terminal, and/or restarting the uplink non-adaptive retransmission in the secondary serving cell by the terminal, after receiving a TA value of the new TAG.

With the embodiment of the present application, interference of the terminal to other terminals due to that the terminal performs communication with an access point in a new TAG by using an old TA value, after it performs TAG reconfiguration but has not updated the TA value, especially interference of the terminal to other terminals due to that the terminal transmits an uplink signal in the secondary serving cell according to a wrong TA value.

Embodiment 3

Figure 4:
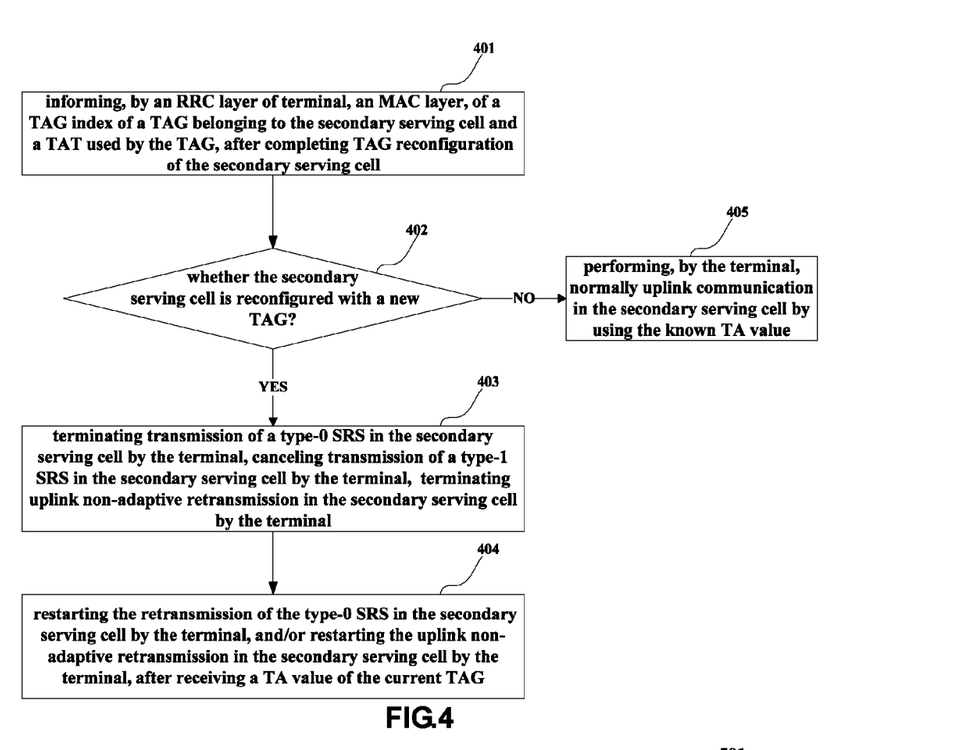
FIG. 4 is a particular flowchart of a method for uplink interference avoidance in case of timing advance group reconfiguration of an embodiment of the present application.

FIG. 4 is a particular flowchart of a method for uplink interference avoidance in case of timing advance group reconfiguration of an embodiment of the present application.

Step 401: for a secondary serving cell, informing, by a radio resource control protocol layer (an RRC layer) of terminal, a medium access control protocol layer (an MAC layer) of a TAG index of a TAG belonging to the secondary serving cell and a timing advance timer (TAT) used by the TAG, after completing TAG reconfiguration of the secondary serving cell;

step 402: judging, by the MAC layer of the terminal, whether the secondary serving cell is reconfigured with a new TAG after the MAC layer receives a notification of TAG reconfiguration of the secondary serving cell from the RRC layer; it is possible that one or more TAGs are maintained in the terminal, and if a currently reconfigured TAG is the same as a TAG that is maintained by the terminal, it shows that the currently reconfigured TAG is not a new one, and it enters into step 405; otherwise, it shows that the currently reconfigured TAG is a new one, and it enters into step 403; wherein, if the terminal maintains other TAGs, a corresponding TA value is known, and the terminal may use the TA value for uplink communication, without interference to the other terminals;

step 403: terminating transmission of a type-0 SRS in the secondary serving cell by the terminal, canceling transmission of a type-1 SRS in the secondary serving cell by the terminal, and terminating uplink non-adaptive retransmission in the secondary serving cell by the terminal; one or more of the above three method of processing may be employed by the terminal, which is determined according to a type of uplink communication of the terminal in the secondary serving cell;

wherein, either one of the following manners may be employed by the terminal in terminating uplink non-adaptive retransmission in the secondary serving cell: first, the terminal maintains all feedback flags for uplink hybrid automatic retransmission requests (possibly including flags for transmission success and flags for transmission failure)

unchanged, and terminates the uplink non-adaptive retransmission in the secondary serving cell; second, setting feedback flags for uplink hybrid automatic retransmission requests by the terminal as flags for transmission success, thereby making the uplink non-adaptive retransmission in the secondary serving cell terminated;

step 404: restarting the retransmission of the type-0 SRS in the secondary serving cell by the terminal, and/or restarting the uplink non-adaptive retransmission in the secondary serving cell by the terminal (for the above first manner), after receiving a TA value of the newly configured TAG, for example, receiving the TA value in the manner of the embodiment shown in FIG. 2, the above twp types of transmission being determined in dependence on a demand of uplink communication of the terminal possibly exists in the secondary serving cell; and step 405: performing, by the terminal, normally uplink communication in the secondary serving cell by using the known TA value.

Embodiment 4

Figure 5:
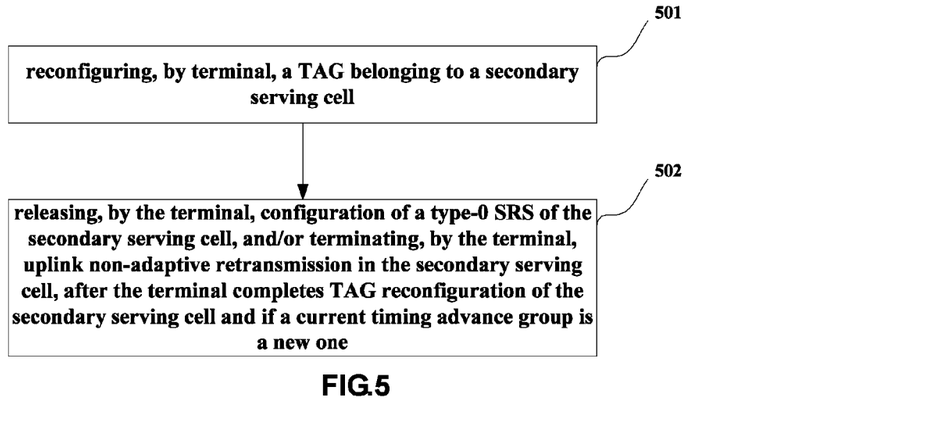
FIG. 5 is a flowchart of a method for uplink interference avoidance in case of timing advance group reconfiguration of an embodiment of the present application.

FIG. 5 is a flowchart of a method for uplink interference avoidance in case of timing advance group reconfiguration of an embodiment of the present application.

Step 501: reconfiguring, by terminal, a TAG belonging to a secondary serving cell; and Step 502: releasing, by the terminal, configuration of a type-0 SRS of the secondary serving cell, and/or terminating, by the terminal, uplink non-adaptive retransmission in the secondary serving cell, after the terminal completes TAG reconfiguration of the secondary serving cell and if a current timing advance group is a new one, the released configuration of the type-0 SRS of the terminal making the terminal unable to perform type-0 SRS uplink communication.

Step 502 further includes: canceling, by the terminal, transmission of a type-1 SRS in the secondary serving cell, if there is a pending aperiodic channel sounding reference signal in the secondary serving cell.

After step 502, the method further includes: restarting the retransmission of the uplink non-adaptive retransmission in the secondary serving cell by the terminal, after receiving a TA value of the new TAG, for example, at the time point T2 in FIG. 2.

With the embodiment of the present application, interference of the terminal to other terminals due to that the terminal performs communication with an access point in a new TAG by using an old TA value, after it performs TAG reconfiguration but has not updated the TA value, especially interference of the terminal to other terminals due to that the terminal transmits an uplink signal in the secondary serving cell according to a wrong TA value.

Embodiment 5

Figure 6:
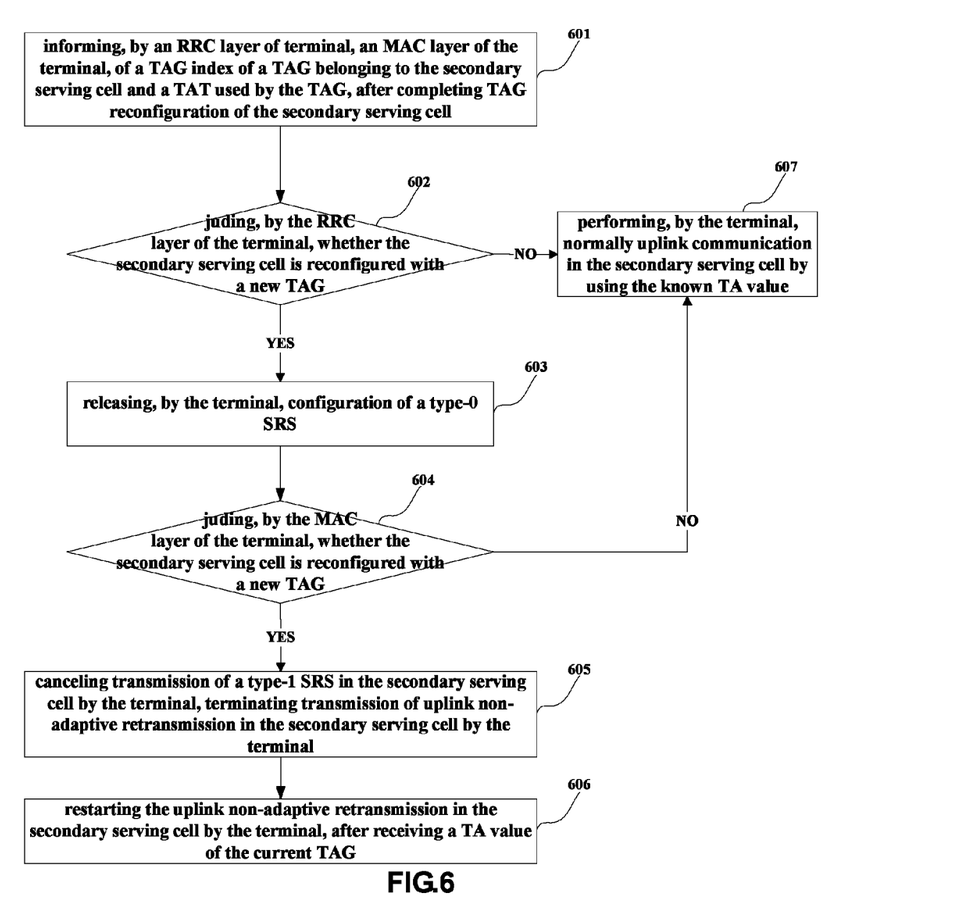
FIG. 6 is a particular flowchart of a method for uplink interference avoidance in case of timing advance group reconfiguration of an embodiment of the present application.

FIG. 6 is a particular flowchart of a method for uplink interference avoidance in case of timing advance group reconfiguration of an embodiment of the present application.

Step 601: for a secondary serving cell, informing, by a radio resource control protocol layer (an RRC layer) of terminal, a medium access control protocol layer (an MAC layer) of the terminal, of a TAG index of a TAG belonging to the secondary serving cell and a timing advance timer (TAT) used by the TAG, after completing TAG reconfiguration of the secondary serving cell;

step 602: judging, by the RRC layer of the terminal, whether the secondary serving cell is reconfigured with a new TAG; it is possible that one or more TAGs are maintained in the terminal, and if a currently reconfigured TAG is the same as a TAG that is maintained by the terminal, it shows that the currently reconfigured TAG is not a new one, and it enters into step 607; otherwise, it shows that the currently reconfigured TAG is a new one, and it enters into step 603;

step 603: releasing, by the terminal, configuration of a type-0 SRS;

step 604: judging, by the MAC layer of the terminal, whether the secondary serving cell is reconfigured with a new TAG after the MAC layer receives a notification of TAG reconfiguration of the secondary serving cell from the RRC layer; it is possible that one or more TAGs are maintained in the terminal, and if a currently reconfigured TAG is the same as a TAG that is maintained by the terminal, it shows that the currently reconfigured TAG is not a new one, and it enters into step 607; otherwise, it shows that the currently reconfigured TAG is a new one, and it enters into step 605; wherein, if the terminal maintains other TAGs, a corresponding TA value is known, and the terminal may use the TA value for uplink communication, without interference to the other terminals;

step 605: canceling transmission of a type-1 SRS in the secondary serving cell by the terminal, and terminating transmission of uplink non-adaptive retransmission in the secondary serving cell by the terminal;

one or more of steps 603, 605 may be employed by the terminal, which is determined by a type of uplink communication of the terminal in the secondary serving cell;

wherein, either one of the following manners may be employed by the terminal in terminating uplink non-adaptive retransmission in the secondary serving cell: first, the terminal maintains all feedback flags for uplink hybrid automatic retransmission requests (possibly including flags for transmission success and flags for transmission failure) unchanged, and terminates the uplink non-adaptive retransmission in the secondary serving cell; second, setting feedback flags for uplink hybrid automatic retransmission requests by the terminal as flags for transmission success, thereby making the uplink non-adaptive retransmission in the secondary serving cell terminated;

step 606: restarting the uplink non-adaptive retransmission in the secondary serving cell by the terminal (for the above first manner), after receiving a TA value of the current TAG, for example, receiving the TA value in the manner of the embodiment shown in FIG. 2; and step 607: performing, by the terminal, normally uplink communication in the secondary serving cell by using the known TA value.

Embodiment 6

Figure 7:
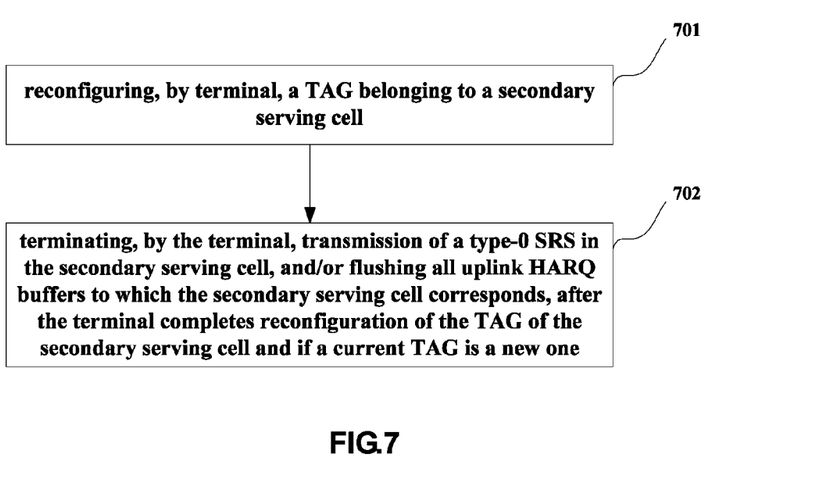
FIG. 7 is a flowchart of a method for uplink interference avoidance in case of timing advance group reconfiguration of an embodiment of the present application.

FIG. 7 is a flowchart of a method for uplink interference avoidance in case of timing advance group reconfiguration of an embodiment of the present application.

Step 701: reconfiguring, by terminal, a TAG belonging to a secondary serving cell; and Step 702: terminating, by the terminal, transmission of a type-0 SRS in the secondary serving cell, and/or flushing all buffers of uplink hybrid automatic retransmission requests (HARQ buffers) to which the secondary serving cell corresponds, after the terminal completes reconfiguration of the TAG of the secondary serving cell and if a current TAG is a new one; wherein flushing the HARQ buffers of the terminal in the secondary serving cell may make the terminal unable to perform uplink non-adaptive retransmission.

Step 702 further includes: canceling, by the terminal, transmission of a type-1 SRS in the secondary serving cell, if there is a pending aperiodic channel sounding reference signal in the secondary serving cell.

After step 702, the method further includes: restarting the transmission of the type-0 SRS in the secondary serving cell by the terminal, after receiving a TA value of the new TAG, for example, at the time point T2 in FIG. 2.

With the embodiment of the present application, interference of the terminal to other terminals due to that the terminal performs communication with an access point in a new TAG by using an old TA value, after it performs TAG reconfiguration but has not updated the TA value, especially interference of the terminal to other terminals due to that the terminal transmits an uplink signal in the secondary serving cell according to a wrong TA value.

Embodiment 7

Figure 8:
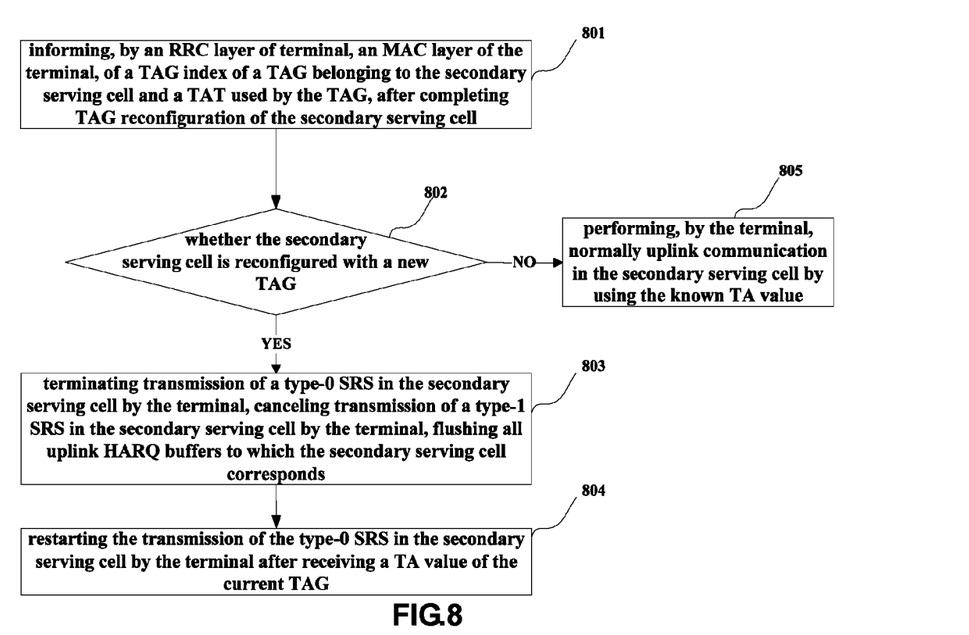
FIG. 8 is a particular flowchart of a method for uplink interference avoidance in case of timing advance group reconfiguration of an embodiment of the present application.

FIG. 8 is a particular flowchart of a method for uplink interference avoidance in case of timing advance group reconfiguration of an embodiment of the present application.

Step 801: for a secondary serving cell, informing, by a radio resource control protocol layer (an RRC layer) of terminal, a medium access control protocol layer (an MAC layer) of the terminal, of a TAG index of a TAG belonging to the secondary serving cell and a timing advance timer (TAT) used by the TAG, after completing TAG reconfiguration of the secondary serving cell;

Step 802: judging, by the MAC layer of the terminal, whether the secondary serving cell is reconfigured with a new TAG after the MAC layer receives a notification of TAG reconfiguration of the secondary serving cell from the RRC layer; it is possible that one or more TAGs are maintained in the terminal, and if a currently reconfigured TAG is the same as a TAG that is maintained by the terminal, it shows that the currently reconfigured TAG is not a new one, and it enters into step 805; otherwise, it shows that the currently reconfigured TAG is a new one, and it enters into step 803; wherein, if the terminal maintains other TAGs, a corresponding TA value is known, and the terminal may use the TA value for uplink communication, without interference to the other terminals;

step 803: terminating transmission of a type-0 SRS in the secondary serving cell by the terminal, canceling transmission of a type-1 SRS in the secondary serving cell by the terminal, and flushing all uplink HARQ buffers to which the secondary serving cell corresponds; one or more of the above three method of processing may be employed by the terminal, which is determined according to a type of uplink communication of the terminal in the secondary serving cell;

step 804: restarting the transmission of the type-0 SRS in the secondary serving cell by the terminal after receiving a TA value of the current TAG, for example, receiving the TA value in the manner of the embodiment shown in FIG. 2, the above restarted retransmission being determined in dependence on a demand of uplink communication of the terminal possibly exists in the secondary serving cell; and step 805: performing, by the terminal, normally uplink communication in the secondary serving cell by using the known TA value.

Embodiment 8

Figure 9:
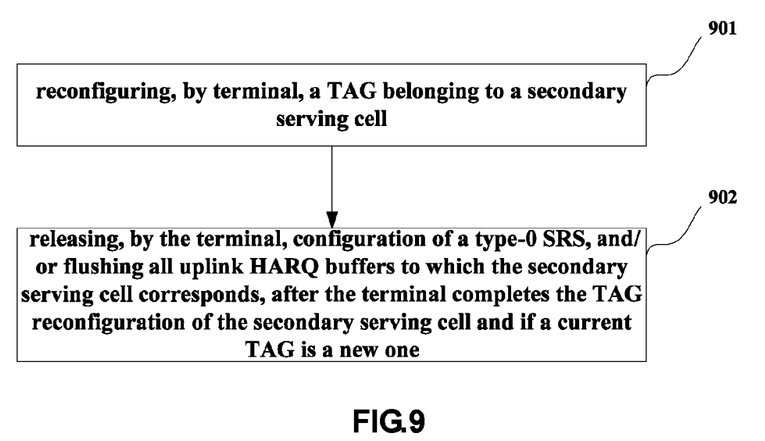
FIG. 9 is a flowchart of a method for uplink interference avoidance in case of timing advance group reconfiguration of an embodiment of the present application.

FIG. 9 is a flowchart of a method for uplink interference avoidance in case of timing advance group reconfiguration of an embodiment of the present application.

Step 901: reconfiguring, by terminal, a TAG belonging to a secondary serving cell; and Step 902: releasing, by the terminal, configuration of a type-0 SRS, and/or flushing all uplink HARQ buffers to which the secondary serving cell corresponds, after the terminal completes the TAG reconfiguration of the secondary serving cell and if a current TAG is a new one; wherein flushing all the uplink HARQ buffers to which the secondary serving cell corresponds may make the terminal unable to perform uplink non-adaptive retransmission, and releasing configuration of a type-0 SRS by the terminal may make the terminal unable to perform type-0 SRS uplink communication.

Step 902 further includes: canceling, by the terminal, transmission of a type-1 SRS in the secondary serving cell, if there is a pending aperiodic channel sounding reference signal in the secondary serving cell.

With the embodiment of the present application, interference of the terminal to other terminals due to that the terminal performs communication with an access point in a new TAG by using an old TA value, after it performs TAG reconfiguration but has not updated the TA value, especially interference of the terminal to other terminals due to that the terminal transmits an uplink signal in the secondary serving cell according to a wrong TA value.

Embodiment 9

Figure 10:
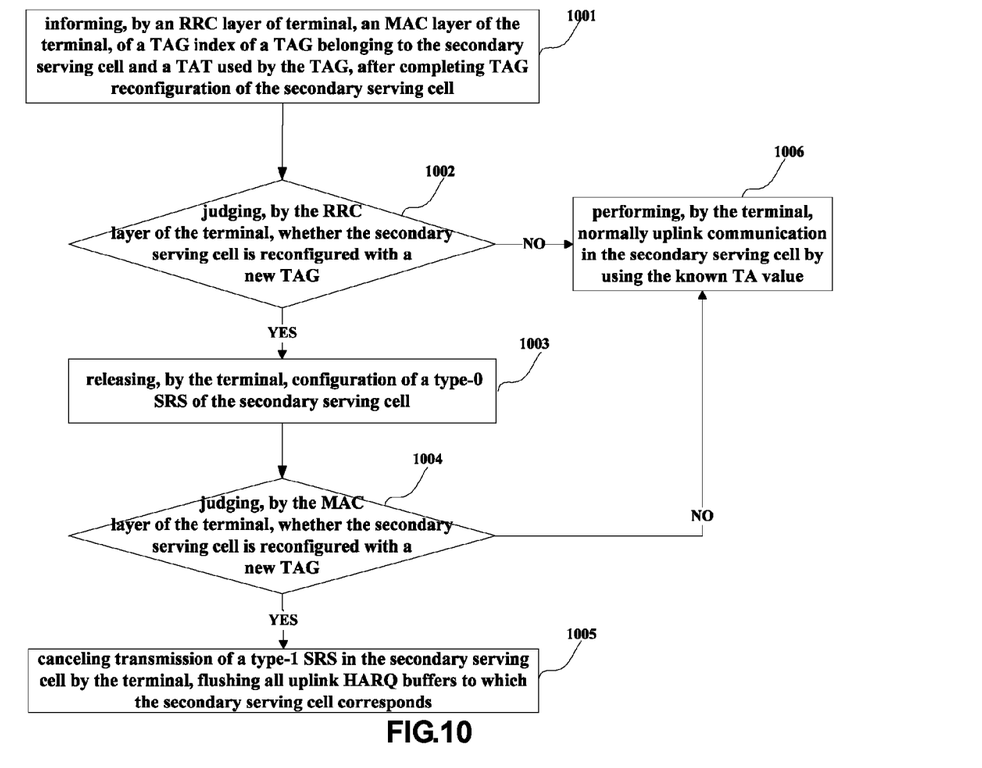
FIG. 10 is a particular flowchart of a method for uplink interference avoidance in case of timing advance group reconfiguration of an embodiment of the present application.

FIG. 10 is a particular flowchart of a method for uplink interference avoidance in case of timing advance group reconfiguration of an embodiment of the present application.

Step 1001: for a secondary serving cell, informing, by a radio resource control protocol layer (an RRC layer) of terminal, a medium access control protocol layer (an MAC layer) of the terminal, of a TAG index of a TAG belonging to the secondary serving cell and a timing advance timer (TAT) used by the TAG, after completing TAG reconfiguration of the secondary serving cell;

step 1002: judging, by the RRC layer of the terminal, whether the secondary serving cell is reconfigured with a new TAG; it is possible that one or more TAGs are maintained in the terminal, and if a currently reconfigured TAG is the same as a TAG that is maintained by the terminal, it shows that the currently reconfigured TAG is not a new one, and it enters into step 1006; otherwise, it shows that the currently reconfigured TAG is a new one, and it enters into step 1003;

step 1003: releasing, by the terminal, configuration of a type-0 SRS of the secondary serving cell;

step 1004: judging, by the MAC layer of the terminal, whether the secondary serving cell is reconfigured with a new TAG after the MAC layer receives a notification of TAG reconfiguration of the secondary serving cell from the RRC layer; it is possible that one or more TAGs are maintained in the terminal, and if a currently reconfigured TAG is the same as a TAG that is maintained by the terminal, it enters into step 1006; otherwise, it enters into step 1005; wherein, if the terminal maintains other TAGs, a corresponding TA value is known, and the terminal may use the TA value for uplink communication, without interference to the other terminals;

step 1005: canceling transmission of a type-1 SRS in the secondary serving cell by the terminal, and flushing all uplink HARQ buffers to which the secondary serving cell corresponds;

one or more of steps 1003, 1005 may be employed by the terminal, which is determined by a type of uplink communication of the terminal in the secondary serving cell;

step 1006: performing, by the terminal, normally uplink communication in the secondary serving cell by using the known TA value.

Embodiment 10

Figure 11:
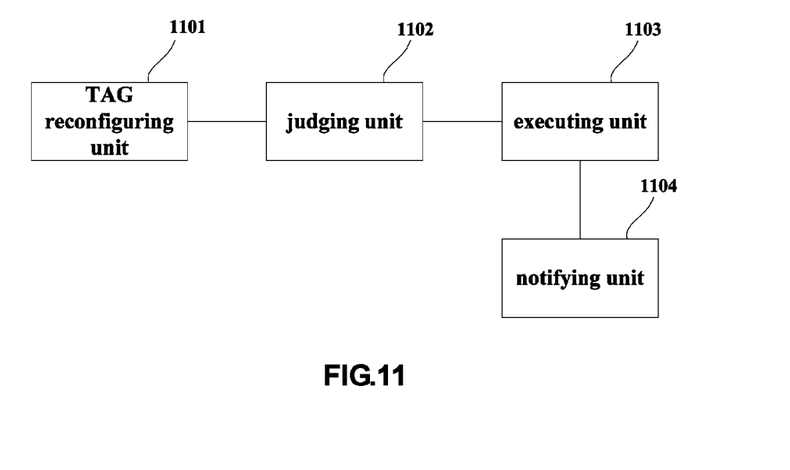
FIG. 11 is a structural diagram of an apparatus for uplink interference avoidance in case of timing advance group reconfiguration of an embodiment of the present application.

FIG. 11 is a structural diagram of an apparatus for uplink interference avoidance in case of timing advance group reconfiguration of an embodiment of the present application.

The apparatus includes a TAG reconfiguring unit 1101, a judging unit 1102 and an executing unit 1103.

The TAG reconfiguring unit 1101 is configured to reconfigure a TAG belonging to a secondary serving cell.

The judging unit 1102 is configured to judge whether the reconfigured TAG is a new one, and if yes, notifying the executing unit 1103.

The executing unit 1103 is configured to terminate transmission of a type-0 SRS in the secondary serving cell performed by terminal, and/or terminate uplink non-adaptive retransmission in the secondary serving cell performed by the terminal, according to a notification transmitted by the judging unit 1102.

The executing unit 1103 is further configured to cancel transmission of a type-1 SRS in the secondary serving cell performed by the terminal, according to a notification transmitted by the judging unit 1102.

The apparatus further includes a notifying unit 1104 configured to notify the executing unit 1103 after the terminal receives a TA value of the new TAG, for example, at the time point T2 in FIG. 2. At this moment, the executing unit 1103 may restart the transmission of the type-0 SRS in the secondary serving cell performed by the terminal, and/or restart the uplink non-adaptive retransmission in the secondary serving cell performed by the terminal.

With the embodiment of the apparatus of the present application, interference of the terminal to other terminals due to that the terminal performs communication with an access point in a new TAG by using an old TA value, after it performs TAG reconfiguration but has not updated the TA value, especially interference of the terminal to other terminals due to that the terminal transmits an uplink signal in the secondary serving cell according to a wrong TA value.

Embodiment 11

Figure 12:
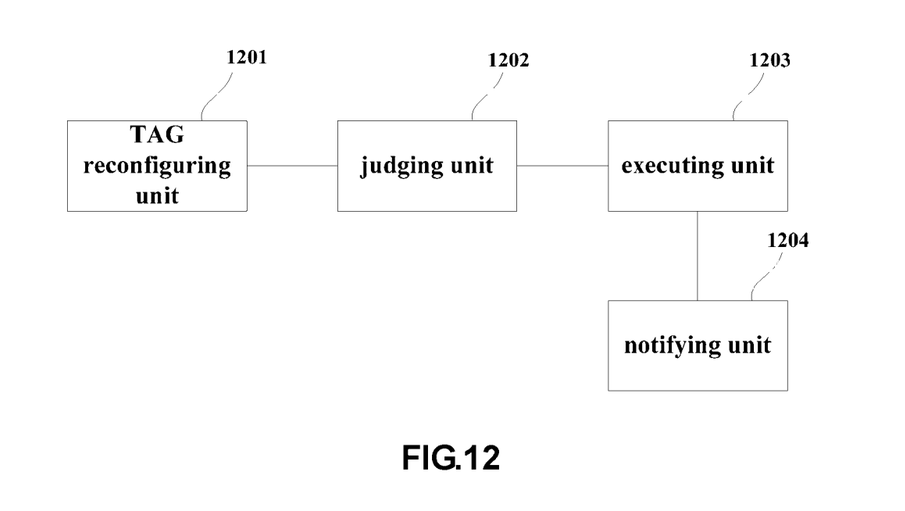
FIG. 12 is a structural diagram of an apparatus for uplink interference avoidance in case of timing advance group reconfiguration of an embodiment of the present application.

FIG. 12 is a structural diagram of an apparatus for uplink interference avoidance in case of timing advance group reconfiguration of an embodiment of the present application.

The apparatus includes a TAG reconfiguring unit 1201, a judging unit 1202 and an executing unit 1203.

The TAG reconfiguring unit 1201 is configured to reconfigure a TAG belonging to a secondary serving cell The judging unit 1202 is configured to judge whether the reconfigured TAG is a new one, and if yes, notifying the executing unit 1202.

The executing unit 1203 is configured to release configuration of a type-0 SRS of the terminal in the secondary serving cell, and/or terminate uplink non-adaptive retransmission in the secondary serving cell performed by the terminal, according to a notification transmitted by the judging unit 1202.

The executing unit 1302 is further configured to cancel transmission of a type-1 SRS in the secondary serving cell performed by the terminal, according to a notification transmitted by the judging unit 1202.

When the executing unit maintains all feedback flags of uplink hybrid automatic retransmission requests unchanged, and terminates uplink non-adaptive retransmission in the secondary serving cell performed by the terminal, the apparatus further includes a notifying unit 1204 configured to, after the terminal receives a TA value of the new TAG, for example, at the time point T2 in FIG. 2, notify the executing unit 1203. At this moment, the executing unit 1203 may restart the uplink non-adaptive retransmission in the secondary serving cell.

With the embodiment of the apparatus of the present application, interference of the terminal to other terminals due to that the terminal performs communication with an access point in a new TAG by using an old TA value, after it performs TAG reconfiguration but has not updated the TA value, especially interference of the terminal to other terminals due to that the terminal transmits an uplink signal in the secondary serving cell according to a wrong TA value.

Embodiment 12

Figure 13:
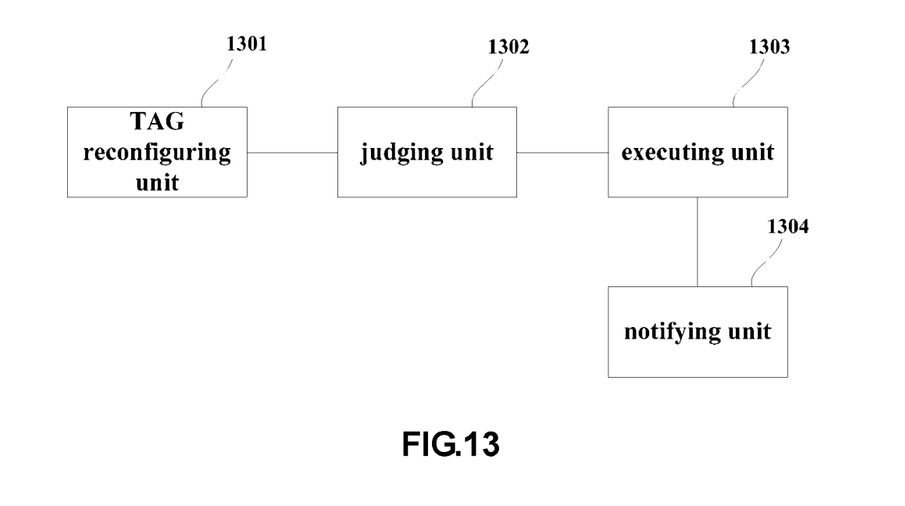
FIG. 13 is a structural diagram of an apparatus for uplink interference avoidance in case of timing advance group reconfiguration of an embodiment of the present application.

FIG. 13 is a structural diagram of an apparatus for uplink interference avoidance in case of timing advance group reconfiguration of an embodiment of the present application.

The apparatus includes a TAG reconfiguring unit 1301, a judging unit 1302 and an executing unit 1303.

The TAG reconfiguring unit 1301 is configured to reconfigure a TAG belonging to a secondary serving cell.

The judging unit 1302 is configured to judge whether the reconfigured TAG is a new one, and if yes, notifying the executing unit 1303.

The executing unit 1303 is configured to terminate transmission of a type-0 SRS in the secondary serving cell performed by the terminal, and/or flush all uplink HARQ buffers to which the secondary serving cell of the terminal corresponds, according to a notification transmitted by the judging unit 1302.

The executing unit 1303 is further configured to cancel transmission of a type-1 SRS in the secondary serving cell performed by the terminal, according to a notification transmitted by the judging unit 1302.

The apparatus further includes a notifying unit 1304 configured to, after the terminal receives a TA value of the new TAG, for example, at the time point T2 in FIG. 2, notify the executing unit 1303. At this moment, the executing unit 1303 may restart the transmission of the type-0 SRS in the secondary serving cell.

With the embodiment of the apparatus of the present application, interference of the terminal to other terminals due to that the terminal performs communication with an access point in a new TAG by using an old TA value, after it performs TAG reconfiguration but has not updated the TA value, especially interference of the terminal to other terminals due to that the terminal transmits an uplink signal in the secondary serving cell according to a wrong TA value.

Embodiment 13

Figure 14:
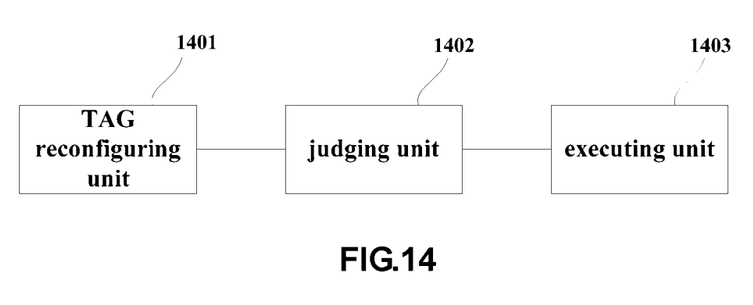
FIG. 14 is a structural diagram of an apparatus for uplink interference avoidance in case of timing advance group reconfiguration of an embodiment of the present application.

FIG. 14 is a structural diagram of an apparatus for uplink interference avoidance in case of timing advance group reconfiguration of an embodiment of the present application.

The apparatus includes a TAG reconfiguring unit 1401, a judging unit 1402 and an executing unit 1403.

The TAG reconfiguring unit 1401 is configured to reconfigure a TAG belonging to a secondary serving cell;

The judging unit 1402 is configured to judge whether the reconfigured TAG is a new one, and if yes, notifying the executing unit 1403.

The executing unit 1403 is configured to release configuration of a type-0 SRS of the terminal in the secondary serving cell, and/or flush all uplink HARQ buffers to which the secondary serving cell of the terminal corresponds, according to a notification transmitted by the judging unit 1302.

The executing unit 1403 is further configured to cancel transmission of a type-1 SRS in the secondary serving cell performed by the terminal, according to a notification transmitted by the judging unit 1402.

With the embodiment of the apparatus of the present application, interference of the terminal to other terminals due to that the terminal performs communication with an access point in a new TAG by using an old TA value, after it performs TAG reconfiguration but has not updated the TA value, especially interference of the terminal to other terminals due to that the terminal transmits an uplink signal in the secondary serving cell according to a wrong TA value.

The above apparatuses and methods of the present application may be implemented by hardware, or by hardware in combination with software. The present application relates to such a computer-readable program that when the program is executed by a logic device, the logic device is enabled to carry out the apparatus or components as described above, or to carry out the methods or steps as described above. The present application also relates to a storage medium for storing the above program, such as a hard disk, a floppy disk, a CD, a DVD, and a flash memory, etc.

The present application is described above with reference to particular embodiments. However, it should be understood by those skilled in the art that such a description is illustrative only, and not intended to limit the protection scope of the present application. Various variants and modifications may be made by those skilled in the art according to the spirits and principle of the present application, and such variants and modifications fall within the scope of the present application.

What is claimed is:

1. A terminal, comprising:
a memory that stores a plurality of instructions; and
a processor coupled to the memory and configured to execute the instructions to:
reconfigure a timing advance group belonging to a secondary serving cell;
judge whether the reconfigured timing advance group is the same as a previous timing advance group maintained by the terminal; and
terminate transmission of a periodic channel sounding reference signal in the secondary serving cell performed by the terminal, and/or terminate uplink non-adaptive retransmission in the secondary serving cell performed by the terminal, if the reconfigured timing advance group is not the same as the previous timing advance group.

2. The terminal according claim 1, wherein the processor further executes the instructions to cancel transmission of an aperiodic channel sounding reference signal in the secondary serving cell performed by the terminal, if the reconfigured timing advance group is not the same as the previous timing advance group.

3. The terminal according claim 1, wherein the processor further executes the instructions to
restart the transmission of the periodic channel sounding reference signal in the secondary serving cell performed by the terminal, and/or restart the uplink non-adaptive retransmission in the secondary serving cell performed by the terminal, after the terminal receives a timing advance value of the reconfigured timing advance group if the reconfigured timing advance group is not the same as the previous timing advance group.

4. The terminal according to claim 1, wherein the processor further executes the instructions to maintain all feedback flags for uplink hybrid automatic retransmission requests unchanged and terminate the uplink non-adaptive retransmission in the secondary serving cell after the terminal completes the reconfiguration of the timing advance group of the secondary serving cell and if the reconfigured timing advance group is not the same as the previous timing advance group maintained by the terminal.

5. The terminal according to claim 1, wherein the processor further executes the instructions to set all feedback flags for uplink hybrid automatic retransmission requests as transmission success after the terminal completes the reconfiguration of the timing advance group of the secondary serving cell and if the reconfigured timing advance group is not the same as the previous timing advance group maintained by the terminal.

6. A terminal, comprising:
a memory that stores a plurality of instructions; and
a processor coupled to the memory and configured to execute the instructions to:
reconfigure a timing advance group belonging to a secondary serving cell;
judge whether the reconfigured timing advance group is the same as a previous timing advance group maintained by the terminal; and
release configuration of a periodic channel sounding reference signal of the terminal in the secondary serving cell, and/or terminate uplink non-adaptive retransmission in the secondary serving cell performed by the terminal, if the reconfigured timing advance group is not the same as the previous timing advance group.

7. The terminal according claim 6, wherein the processor further executes the instructions to cancel transmission of an aperiodic channel sounding reference signal in the secondary serving cell performed by the terminal, if the reconfigured timing advance group is not the same as the previous timing advance group.

8. The terminal according claim 6, wherein if the processor executes the instruction to maintain all feedback flags of uplink hybrid automatic retransmission requests unchanged, and terminate uplink non-adaptive retransmission in the secondary serving cell performed by the terminal, the processor further executes the instructions to:
restart the uplink non-adaptive retransmission in the secondary serving cell, after the terminal receives a timing advance value of the reconfigured timing advance group if the reconfigured timing advance group is not the same as the previous timing advance group.

9. The terminal according to claim 6, wherein the processor further executes the instruction to set all feedback flags for uplink hybrid automatic retransmission requests as transmission success after the terminal completes the reconfiguration of the timing advance group of the secondary serving cell and if the reconfigured timing advance group is not the same as the previous timing advance group maintained by the terminal.

10. A terminal, comprising:
a memory that stores a plurality of instructions; and
a processor coupled to the memory and configured to execute the instructions to:
reconfigure a timing advance group belonging to a secondary serving cell;
judge whether the reconfigured timing advance group is the same as a previous timing advance group maintained by the terminal; and
terminate transmission of a periodic channel sounding reference signal in the secondary serving cell performed by the terminal, and/or flush all buffers of uplink hybrid automatic retransmission requests to which the secondary serving cell of the terminal corresponds, if the reconfigured timing advance group is not the same as the previous timing advance group.

11. The terminal according to claim 10, wherein the processor executes the instruction to cancel transmission of an aperiodic channel sounding reference signal in the secondary serving cell performed by the terminal, if the reconfigured timing advance group is not the same as the previous timing advance group.

12. The terminal according claim 10, wherein the processor further executes the instruction to:
   restart the periodic channel sounding reference signal in the secondary serving cell performed by the terminal, after the terminal receives a timing advance value of the reconfigured timing advance group if the reconfigured timing advance group is not the same as the previous timing advance group.

13. A terminal, comprising:
   a memory that stores a plurality of instructions; and
   a processor coupled to the memory and configured to execute the instructions to:
      reconfigure a timing advance group belonging to a secondary serving cell;
      judge whether the reconfigured timing advance group is the same as a previous timing advance group maintained by the terminal; and
      release configuration of a periodic channel sounding reference signal of the terminal in the secondary serving cell, and/or flush all buffers of uplink hybrid automatic retransmission requests to which the secondary serving cell of the terminal corresponds, if the reconfigured timing advance group is not the same as the previous timing advance group.

14. The terminal according claim 13, wherein processor further executes the instruction to cancel transmission of an aperiodic channel sounding reference signal in the secondary serving cell performed by the terminal, if the reconfigured timing advance group is not the same as the previous timing advance group.

* * * * *